United States Patent
Tsai

(10) Patent No.: US 9,350,960 B2
(45) Date of Patent: May 24, 2016

(54) LASER PROJECTION DEVICE AND METHOD FOR MANIPULATING THE SAME

(71) Applicant: LITE-ON IT CORPORATION, Taipei (TW)

(72) Inventor: Fu-Ji Tsai, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 217 days.

(21) Appl. No.: 14/134,232

(22) Filed: Dec. 19, 2013

(65) Prior Publication Data

US 2014/0204966 A1    Jul. 24, 2014

(30) Foreign Application Priority Data

Jan. 18, 2013   (CN) .......................... 2013 1 0019860

(51) Int. Cl.
    *G03B 21/14*   (2006.01)
    *H04N 9/31*    (2006.01)
    *G02B 26/10*   (2006.01)

(52) U.S. Cl.
    CPC ............. *H04N 9/317* (2013.01); *H04N 9/3135* (2013.01); *G02B 26/101* (2013.01)

(58) Field of Classification Search
    CPC ........ G03B 26/10; G03B 21/00; G03B 21/14; G03B 21/20
    See application file for complete search history.

(56) References Cited

U.S. PATENT DOCUMENTS

2009/0316116 A1* 12/2009 Melville .............. A61B 1/0008
                                                    353/31
2012/0120375 A1*  5/2012 Kilcher ................. G01S 7/4814
                                                    353/98

* cited by examiner

*Primary Examiner* — Sultan Chowdhury
*Assistant Examiner* — Danell L Owens
(74) *Attorney, Agent, or Firm* — Rabin & Berdo, P.C.

(57) ABSTRACT

A method for manipulating a laser projection device is provided. A laser projection device comprising a laser source, a driving module and a scanning mirror module is provided. The laser source provides a laser beam. The scanning mirror module disposed at one side of the laser source reflects the laser beam, so that the laser beam performs a scanning motion to form a projection track on a projection region. According to a projection distance, the driving module provides a first drive signal to modulate the number of scanning times of the scanning mirror module and provides a second drive signal to control the on/off time of the laser source to adjust an initial image resolution to a corresponding image resolution lower than the initial image resolution to maintain the frame quality of laser projection. The projection distance is a distance between the laser source and the projection region.

13 Claims, 5 Drawing Sheets

LASER PROJECTION DEVICE AND METHOD FOR MANIPULATING THE SAME

This application claims the benefit of People's Republic of China application Serial No. 201310019860.5, filed Jan. 18, 2013, the subject matter of which is incorporated herein by reference.

BACKGROUND OF THE INVENTION

1. Field of the Invention

The invention relates in general to a laser projection device and a method for manipulating the same, and more particularly to a laser projection device modulating image resolution according to a projection distance and a method for manipulating the same.

2. Description of the Related Art

The integration of various functions and applications on portable electronic device (such as mobile phone) has become a mainstream trend in the research and development of the industries. Integrated projection system (such as micro-projection system) can be used for projecting frame message (such as films and web-pages) for user's portable application as well as social activities such as conference and video call.

The laser projection system depends on a collimated laser source, which performs scanning along with the time to generate image frames. As the projection distance varies, the size of light spots projected on a projection screen changes accordingly. The projection angle of the laser source does not vary with the projection distance. When the projection distance is reduced, the area of the projection image projected on the projection screen is reduced accordingly. Because the resolution of projection image remains unchanged and the same quantity of projection pixels projected on an area-reduced projection image, the ratio of the light spots projected on the projection screen with respect to the size of the pixels will become larger and the light spots will overlap with each other. Consequently, the color of image frame is distorted, the color saturation of projection image is reduced and the display quality is affected.

SUMMARY OF THE INVENTION

The invention is directed to a laser projection device and a method for manipulating the same. The laser projection device provides a drive signal to drive the scanning mirror module and control the on/off state of a light beam of a laser source according to corresponding image resolution of a projection distance, and further modulates the image resolution so that projection quality corresponds to the projection distance.

According to one embodiment of the present invention, a method for manipulating a laser projection device is provided. The method comprises following steps. A laser projection device comprising a laser source, a driving module and a scanning mirror module is provided. The scanning mirror module is disposed at one side of the laser source. The laser source provides a laser beam. The scanning mirror module is swayed to reflect the laser beam, so that the laser beam performs a scanning motion to form a projection track on a projection region. According to a projection distance, the driving module provides a first drive signal to drive the scanning mirror module to modulate the number of scanning times of the scanning mirror module and provides a second drive signal to control the on/off time of the laser source to adjust an initial image resolution to a corresponding image resolution so as to maintain the image quality of laser projection. The projection distance is a distance between the laser source and the projection region. The corresponding image resolution is lower than the initial image resolution.

According to another embodiment of the present invention, a method for manipulating a laser projection device is provided. The method comprises following steps. A laser projection device comprising a laser source, a driving module and a scanning mirror module is provided. The scanning mirror module is disposed at one side of the laser source. The laser source provides a laser beam. The scanning mirror module is swayed to reflect the laser beam and form a projection track on a projection region. According to the reduction in a projection distance, the driving module adjusts an initial image resolution to a corresponding image resolution, modulates the on/off time of the laser source, adjusts at least one of the density and arrangement of the projection pixels on the projection region, and outputs a drive signal to drive a laser source according to a corresponding image resolution lower than the initial image resolution to maintain the image quality of laser projection. The projection distance is a distance between the laser source and the projection region.

According to an alternate embodiment of the present invention, a laser projection device is provided. The laser projection device is a laser micro-projection device. The laser projection device operates according to the said method for manipulating a laser projection device.

The above and other aspects of the invention will become better understood with regard to the following detailed description of the preferred but non-limiting embodiment(s). The following description is made with reference to the accompanying drawings.

DETAILED DESCRIPTION OF THE INVENTION

The relation between the size of projection pixel of the laser projection device and the projection distance according to experimental results is exemplified below. Based on the relation between the size of projection pixel and the projection distance, the reasons why projection quality is subjected to the projection distance and the factors resulting in poor projection quality are found. Furthermore, a display device for resolving the above problems and a method for manipulating the same are provided.

Figure 1:
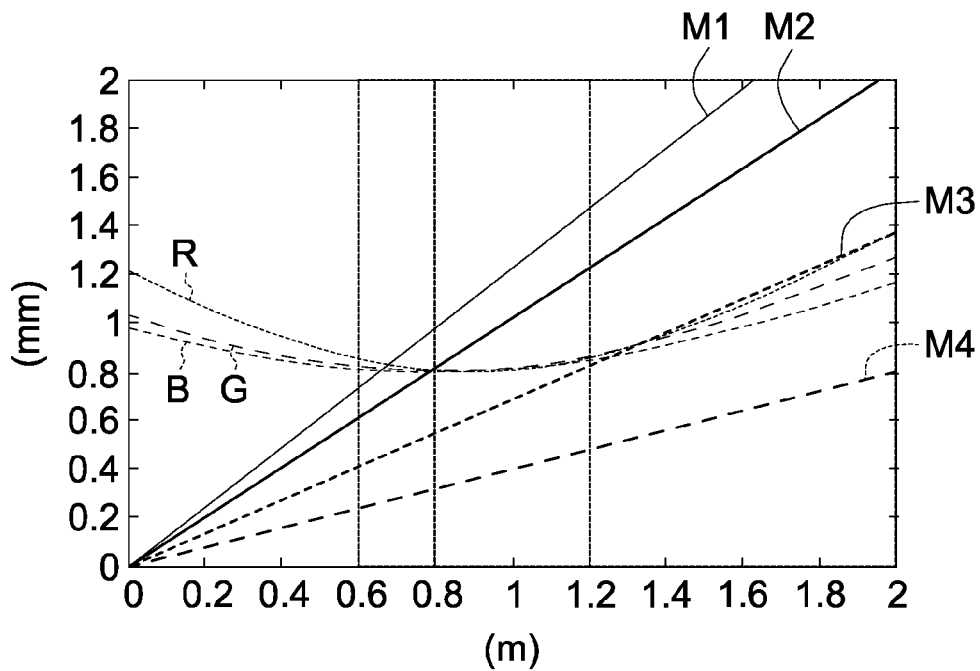
FIG. 1 is a schematic diagram showing the relation between the projection distance of laser source and the size of corresponding projection pixel according to an embodiment of the invention.

FIG. 1 is a schematic diagram showing the relation between the projection distance of laser source and the size of corresponding projection pixel according to an embodiment of the invention. A projection pixel refers to the area of a light spot on the projection region, that is, the size of a light spot. A light spot is the projection of a laser beam of the laser source on the projection region. Referring to FIG. 1, the vertical axis represents the diameter of projection pixel in the unit of millimeter (mm), and the horizontal axis represents the projection distance in the unit of meter (m). Given that the projection angle is fixed, curve M1 represents an upper limit of visual verification being 480p resolution (854×480), curve M2 represents an upper limit of visual verification being 720p resolution (1280×720), curve M3 represents an upper limit of visual verification being 1080p resolution (1920×1080), curve M4 represents a lower limit of visual verification being 1080p resolution. Curve R, curve G and curve B respectively represent a red laser source, a green laser source and a blue laser source which are collimated and conformed to 1080p resolution.

Based on the principles of image verification, such as the Rayleigh verification principle (also referred as the Rayleigh criterion), the size of projection pixel is subjected to a physical limit (such as a recognizable limit to human eyes). Thus, only one particular segment of projection distance satisfies the 1080p resolution, and the projection pixels outside the particular segment are beyond the physical limit recognizable to human eyes and will have severe overlapping.

Taking the curves of FIG. 1 for example, the particular segment for 1080p resolution is 1.2 m onwards. It should be noted that FIG. 1 only illustrates the projection distance up to 2 m. The relation between the projection distance and the size of projection pixel may be different for the laser source with different collimation design. For a particular laser source, the particular segment may be extended beyond 2 m. When the projection distance of the laser source is shorter (such as 0.8 m~1.2 m), the ratio of the light spots projected on the projection screen by the laser source with respect to the size of the pixels will become larger and the light spots will overlap with each other. Therefore, the projection pixels of the laser source cannot be verified at 1080p resolution. In other words, the resolution of the laser projection system is subjected to the projection distance.

The image resolution of the frame projected by the laser projection device is related to the density of projection pixels of the laser source. The sizes of projection pixels projected at different projection distances depend on the characteristics of free space propagation of coherent light under Gaussian distribution. Generally speaking, the shorter the projection distance, the larger the area of projection pixel on the projection screen. However, the user will not operate the laser projection device at a projection distance conformed to the high image resolution (such as 1080p) because of the focus free characteristics and convenience operation of the laser projection device (particularly, the laser micro-projection device).

On the other hand, in order to increase the image resolution of laser projection to satisfy the needs of the market, the size of projection pixel must be reduced. When the laser projection device performs a short-range projection, the size of projection pixel cannot be conformed to the verification rate of high resolution image. Although the frame formed by the projection pixels is still viewable, the display quality (such as color saturation and color gamut) of projection image will deteriorate greatly, and the advantages of high color saturation and wide color gamut of the laser projection device will be jeopardized. Therefore, a laser projection device capable of resolving the above problems and a method for manipulating the same are disclosed below.

Figure 2:
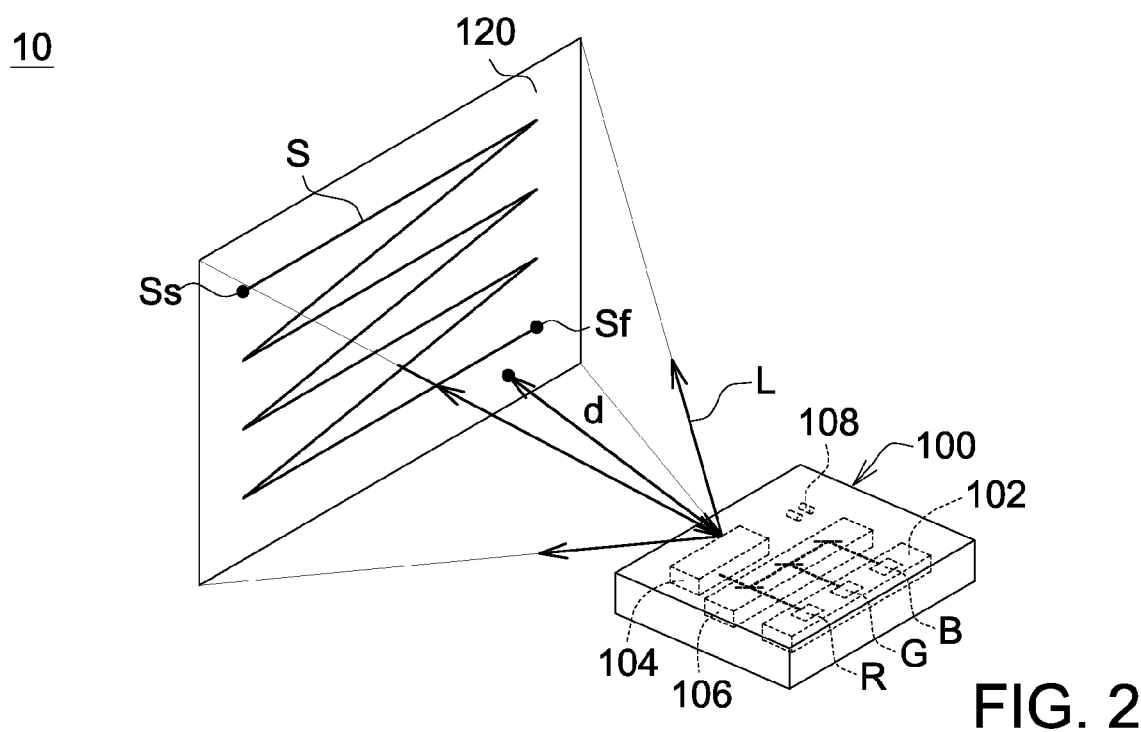
FIG. 2 is a schematic diagram of a laser projection system according to an embodiment of the invention.

FIG. 2 is a schematic diagram of a laser projection system according to an embodiment of the invention. The laser projection system 10 comprises a laser projection device 100 and a projection region 120. The laser projection device 100, such as a laser micro-projection device, comprises a laser source 102, a scanning mirror module 104, a reflective mirror group 106, a distance detection unit 108 and a driving module (not illustrated). The laser source 102 comprises a red laser source R, a green laser source G and a blue laser source B.

The reflective mirror group 106 is selectively disposed for adjusting the path of a laser beam L emitted by the laser source 102. Preferably, the reflective mirror group 106 is equipped with filter function and polarization control function for integrating the laser beams emitted by the red laser source R, green laser source G and blue laser source B into one single laser beam L which enters the scanning mirror module 104. The scanning mirror module 104 is disposed at one side of the laser source 102, and can be realized by one single mirror or a mirror group. The single mirror or mirror group may sway along 2D direction to reflect the laser beam L, so that the reflected laser beam L performs a scanning motion to form a projection track S on the projection region 120. The projection track S comprises a scan starting point Ss and a scan finishing point Sf. A plurality of scanning rows are serially connected between the scan starting point Ss and the scan finishing point Sf.

The driving module (not illustrated) provides a drive signal to control the on/off state of the laser beam L of the laser source 102 according to an image resolution corresponding to a projection distance d. The projection distance d is such as a vertical projection distance between the laser source 102 and the projection region 120. The corresponding image resolution refers to the recognizable image resolution that can be obtained according to the relation between the projection distance d and the size of projection pixel.

Figure 3:
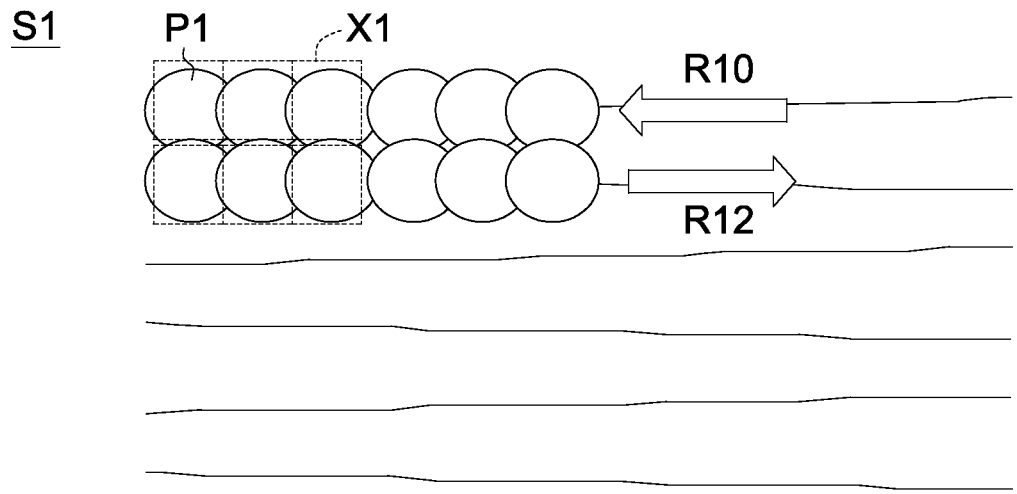
FIG. 3 is a schematic diagram of a portion of projection track of a light beam projected on a projection region according to an embodiment of the invention.

FIG. 3 is a schematic diagram of a portion of projection track of a light beam projected on a projection region according to an embodiment of the invention. Referring to FIG. 3, the projection track S1 comprises a plurality of projection pixels P1. The projection pixels P1 are the area of light spots projected on the projection region 120 when the laser beam L scans along the paths R10 and R12.

The pixel definition region X1 is a dummy region range associated with image resolution. For example, when the resolution is 1080p (that is, 1920×1080), the vertical axis direction of the projection region 120 is divided into 1080 segments, and the horizontal axis direction of the projection region 120 is divided into 1920 segments. The vertical axis and the horizontal axis together form 1080×1920 grids, and each grid is a pixel definition region X1.

Suppose the laser projection device 100 is set to project with high quality resolution (such as 1080p), the projection distance d is between 1.2 m~2 m, and each projection pixel P1 is correspondingly disposed on the pixel definition region X1. Meanwhile, each projection pixel P1 is recognizable to human eyes. 'Recognizable' here refers to making judgment based on principles of image verification (such as Rayleigh verification principle).

Figure 4:
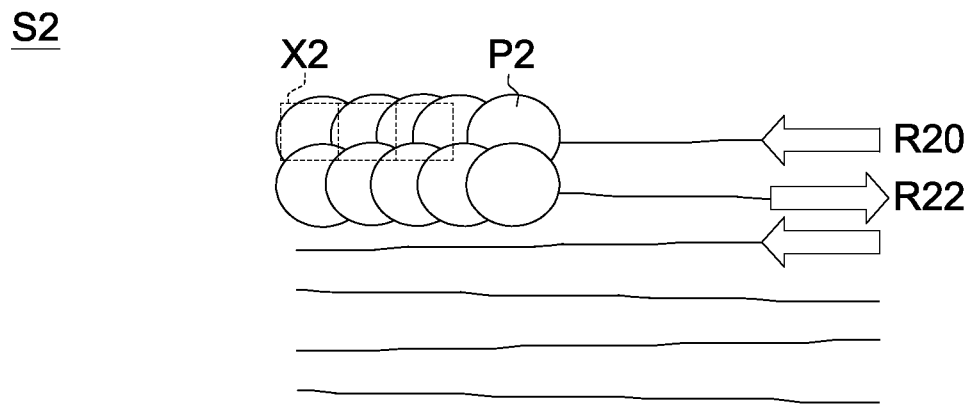
FIG. 4 is a schematic diagram of a portion of projection track of a light beam projected on a projection region according to another embodiment of the invention.

FIG. 4 is a schematic diagram of a portion of projection track of a light beam projected on a projection region according to another embodiment of the invention. Referring to FIGS. 2 and 4, the projection track S2 comprises a plurality of projection pixels P2. The projection pixels P2 are the area of light spots projected on the projection region 120 when the laser beam L scans along the paths R20 and R22. The paths R20 and R22 are tracks of the laser beam L on the projection region 120 and are associated with the structure of the scanning mirror module 104, wherein the laser beam L is reflected by the oscillating scanning mirror module 104. The pixel definition region X2 is a dummy region range associated with image resolution. The definition of the pixel definition region X2 is similar to the pixel definition region X1 of FIG. 3, and the similarities are not repeated here.

In the present embodiment, the laser projection device 100 is still set to project with high quality resolution (such as 1080p) but the projection distance d is reduced to be less than 1.2 m. Based on the descriptions of FIG. 1, when the projection distance d is reduced and the resolution of projection remains unchanged (such as 1080p), the ratio of each projection pixel P2 with respect to the pixel definition region will increase. Thus, the projection pixels P2 will be projected outside the boundary of the pixel definition region X2 instead of being projected inside the pixel definition region X2. Furthermore, adjacent pixel definition regions X2 will overlap, making each projection pixel P2 unrecognizable. When adjacent projection pixels P2 are projected by laser beams of different colors (such as RGB), red light spots, blue light spots and green light spots are unrecognizable. Thus, after the laser beam L performs a scanning motion to form an image on the projection region 120, the RGB lights will stack one another on the plane of the projection region 120. Consequently, the lights are mixed in the space (for example, the RGB lights are mixed to form a white light), and result in image distortion.

Detailed descriptions of a display device resolving the problem of image distortion caused by the restriction of projection distance and a method for manipulating the same are exemplified below in a number of embodiments.

First Embodiment

Referring to FIG. 2, in an embodiment, the scanning mirror module 104 is such as a bidirectional scanning mirror. Moreover, the laser projection device 100 further comprises a drive unit (not illustrated), which provides a drive signal (electric signal) to drive the 2D micro-electro-mechanical mirror (not illustrated) of the scanning mirror module 104 for driving the gimbal and the mirror of the 2D micro-electro-mechanical mirror to rotate with respect to the two axes at two frequency ranges respectively. The gimbal correspondingly controls the scanning motion of the 2D micro-electro-mechanical mirror along the vertical direction. The mirror correspondingly controls the scanning motion of the 2D micro-electro-mechanical mirror along the horizontal direction. The drive signal (electric signal) provided by the drive unit modulates the number of scanning times of the scanning mirror module 104. The drive unit can be disposed in the driving module or can be disposed in an independent manner, and the invention is not limited thereto.

The gimbal is associated with the number of frames per unit time (frame rate). In general, the mirror of the 2D micro-electro-mechanical mirror and the structure of the gimbal determine the resonance frequency of the 2D micro-electro-mechanical mirror. In other words, the resonance frequency of mirror is subjected to the mechanical structure of the 2D micro-electro-mechanical mirror, and the 2D micro-electro-mechanical mirror satisfying different levels of image resolution is still unavailable at present. For the 2D micro-electro-mechanical mirror with specific structure operates at 1080p resolution, the gimbal of the 2D micro-electro-mechanical mirror has a drive frequency of 60 Hz, which implies 60 frames are updated per second (the frame rate is 60 Hz), and the mirror has a resonance frequency of 32.4 kHz (the horizontal scanning frequency of the 2D micro-electro-mechanical mirror). For the 2D micro-electro-mechanical mirror with specific structure operates at 720p resolution, the gimbal of the 2D micro-electro-mechanical mirror has a drive frequency of 60 Hz (the frame rate is 60 Hz), and the mirror has a resonance frequency of 21.6 kHz.

Figure 5A:
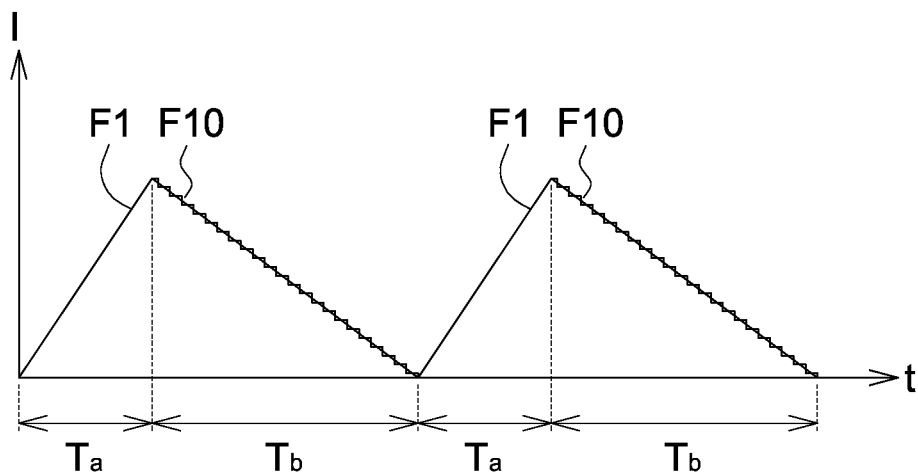
FIGS. 5A~5B are drive wave pattern diagrams of a 2D micro-electro-mechanical mirror according to an embodiment of the invention.
Figure 5B:
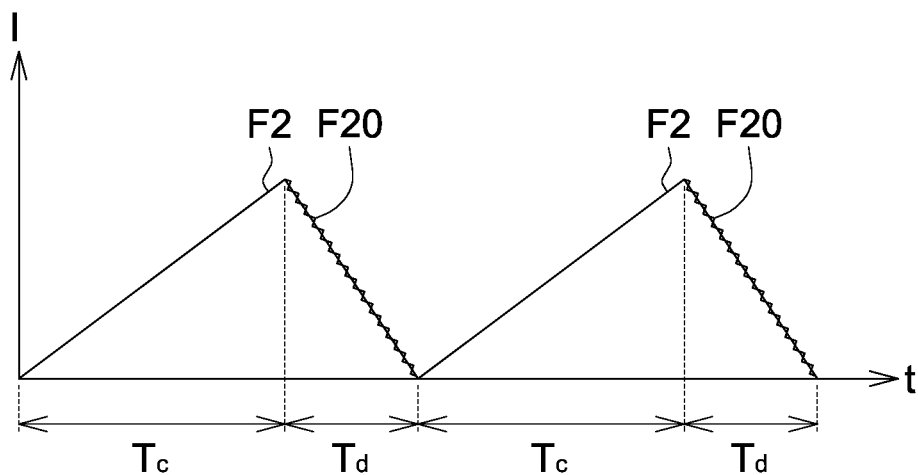

FIGS. 5A~5B are drive wave pattern diagrams of a 2D micro-electro-mechanical mirror according to an embodiment of the invention. The horizontal axis represents time (t) and the vertical axis represents drive signal (such as current signal I). Referring to FIGS. 2 and 5A, it is the drive wave pattern to drive the 2D micro-electro-mechanical mirror moves along the vertical direction. Suppose the frames are updated at a frequency of 60 frames per second (the frame rate is 60 Hz), and the drive wave pattern of the 2D micro-electro-mechanical mirror corresponding to one time of frame is an asymmetric triangle wave F1.

The cycle of triangle wave F1 is equivalent to the sum of time Ta and time Tb. Time Ta is a recovery time of the scanning mirror module 104, and is the time required for the scanning mirror module 104 to control the optical path of the laser beam L to return from the scan finishing point Sf (illustrated in FIG. 2) to the scan starting point Ss (illustrated in FIG. 2). Time Tb is a frame scan time of the scanning mirror module 104, that is, the time required for the scanning mirror module 104 to control the laser beam L to scan from the scan starting point Ss (illustrated in FIG. 2) to the scan finishing point Sf (illustrated in FIG. 2) along the projection track S. The amplitude of the triangle wave F1 corresponds to the scanning angle of the 2D micro-electro-mechanical mirror along the vertical direction. For example, the larger the amplitude of the triangle wave (such as current signal I), the larger the scanning angle of the 2D micro-electro-mechanical mirror along the vertical direction, and vice versa.

Referring to FIG. 5A, within time Ta, the motion of the 2D micro-electro-mechanical mirror enables the optical path of the laser beam L to return the light spot from Sf to Ss. Meanwhile, the laser source 102 is turned off. Within time Tb, the oscillating motion of the 2D micro-electro-mechanical mirror is represented by an oscillation wave F10. Through the oscillation of the 2D micro-electro-mechanical mirror, the optical path of the laser beam L scans at an oscillation frequency of the oscillation wave F10. Meanwhile, the laser source 102 is turned on. In other words, regardless of the laser source 102 being turned on or off, the 2D micro-electro-mechanical mirror oscillates at an oscillation frequency. Since there is no laser beam L when the laser source 102 is turned off, the laser source 102 in an off state cannot project a scanning optical path on the projection region 120.

Referring to FIGS. 5A~5B, in an embodiment, when the projection distance d is reduced and makes the projection pixels of initial (default) image resolution exceed the requirement of image resolution, corresponding image resolution of the projection distance d can be changed by adjusting the drive wave pattern F2 of the drive signal of the 2D micro-electro-mechanical mirror (that is, by adjusting the ratio of time Ta to time Tb) and the ratio between the turn on time and the turn off time of the laser source 102 in one time of frame.

Given that the resonance frequency of the gimbal of the 2D micro-electro-mechanical mirror is fixed and the sum of time Ta and time Tb remains unchanged, the recovery time Ta of the 2D micro-electro-mechanical mirror can be increased to Tc (the turned off time of the laser source 102), and the frame scan time Tb of the 2D micro-electro-mechanical mirror can be decreased to Td (the turn on time of the laser source 102). By modulating the drive wave pattern of the scanning mirror module 104, the ratio between the turn off time Ta and the turn on time Tb of the laser source 102 in the drive wave pattern of the scanning mirror module 104 can be increased to the ratio of the turn off time Tc to the turn on time Td of the laser source 102. Besides, the drive signal for driving the laser source 102 collaborates with the drive wave pattern of the scanning mirror module 104 to correspondingly modulate the on/off time of the laser source 102.

Each scan line needs a fixed time to complete track scanning. When time Tb is reduced to time Td, the number of times of scanning motions performed by 2D micro-electro-mechanical mirror with the laser beam L of the laser source 102 within time Td is less than that performed with the laser beam L of the laser source 102 within time Tb. Since the number of times of scanning motions along the vertical direction is reduced, the image resolution is reduced to a corresponding image resolution of the projection distance d accordingly. Since the sway angle of the 2D micro-electro-mechanical mirror is the same, the scanning angle allocated to each scan row will increase. Therefore, the light spots formed by the projection of the laser beam L on the projection region 120 will not overlap each other, the adjacent projection pixels will not stack and distort the image, and the requirement of image resolution can thus be satisfied. In the present embodiment, it is exemplified that the projection distance d is reduced and the initial image resolution is modulated to a corresponding image resolution, but the invention is not limited thereto.

The laser projection device 100 and the method for manipulating the same disclosed in the present embodiment can adjust the resolution level according to the projection distance d. In an embodiment, the laser projection device 100 further comprises a processor (not illustrated). After the laser projection device 100 uses a distance detection unit 108 to automatically detect the projection distance d, the processor can determine a corresponding recognizable resolution of the projection distance d as an image resolution according to principles of image verification, and the driving module (not illustrated) provides a drive signal of the laser source 102 to drive the laser source 102 according to the image resolution.

In an embodiment, the distance detection unit 108 comprises an active light source and a receiver. The active light source comprises at least one of an infrared laser and an infrared LED for providing a detection light. The detection light is emitted towards the projection region 120, which reflects the detection light after receiving it. The receiver is for receiving the detection light reflected by the projection region 120. According to the triangulation method, the receiver further determines the projection distance d according to the tilt angle at which the detection light is reflected to the receiver from the projection region 120 and the distance between the active light source and the receiver.

In another embodiment, the distance detection unit 108 comprises a light source which provides a pulse light or a modulation light, and at least one of a video camera and a receiver which receives the reflected pulse light or modulation light. The pulse light or modulated light is emitted towards the projection region 120, and is reflected by the projection region 120. After receiving the reflected pulse light or modulation light, the receiver and the video camera may calculate the projection distance d according to the signal delay or phase difference between the transmission and the reception of signal.

In another embodiment, the laser projection device 100 further comprises a memory device (not illustrated) for storing a plurality of sets of resolution conditions. The driving module outputs a drive signal of the laser source 102 to drive the laser beam L according to resolution conditions. Meanwhile, the user can determine whether to adjust the image resolution according to whether the projection image is clear. If the user feels the image is blurred, the user can manually select a default resolution condition built in the memory device to adjust the settings of resolution.

The laser projection device and the method for manipulating the same are disclosed in above embodiment of the invention. When the projection distance decreases and makes the projection pixels exceed the requirement of image resolution, the laser projection device can output a drive signal according to the image resolution to change the ratio between the turn on time and the turn off time of the laser source 102 in one time of frame and the drive wave pattern (F2) of the 2D micro-electro-mechanical mirror so as to decrease image resolution, hence resolving the problem of color distortion which occurs when adjacent projection pixels cannot be recognized and verified and maintaining excellent image quality.

Second Embodiment

Figure 6:
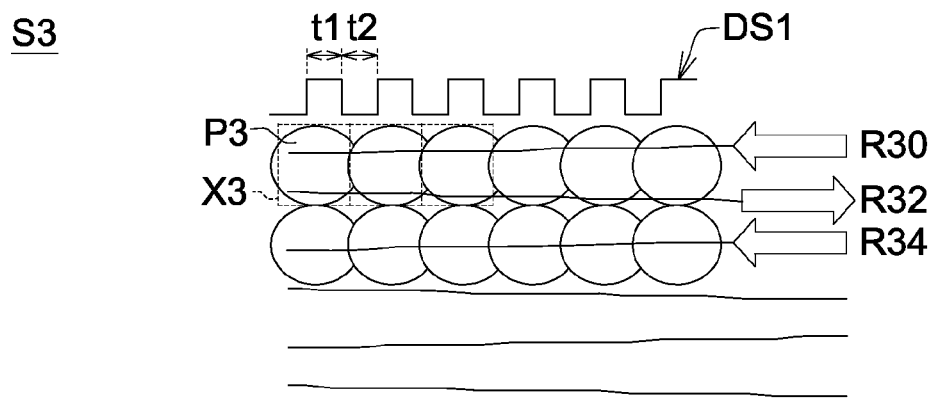
FIG. 6 is a schematic diagram of a portion of projection track of a light beam projected on a projection region according to an alternate embodiment of the invention.

FIG. 6 is a schematic diagram of a portion of projection track of a light beam projected on a projection region according to an alternate embodiment of the invention. Referring to FIG. 5, the projection track S3 comprises a plurality of projection pixels P3. The projection pixels P3 are the area of light spots projected on the projection region 120 when the laser beam L scans along the paths R30 and R34. The paths R30 and R34 are tracks of the laser beam L on the projection region 120 and are associated with the structure of the scanning mirror module 104, wherein the laser beam L is reflected by the scanning mirror module 104. The pixel definition region X3 is a dummy region range associated with image resolution. The definition of the pixel definition region X3 is similar to the pixel definition region X1 of FIG. 3, and the similarities are not repeated here.

As indicated in FIG. 6, the driving module (not illustrated) provides a drive signal DS1 of the laser source 102 for modulating the turn on time of the laser source 102. It can be designed that the laser source 102 is turned on when the drive signal DS1 of the laser source is at a high level (such as corresponding to time t1) and is turned off when the drive signal DS1 of the laser source is at a low level (such as corresponding to time t2). On the projection track S3, the scan path turns on the laser source 102 every second scan row. That is, the laser source 102 is turned on when the scan path is the path R30, is turned off when the scan path is the path R32, and is turned on again when the scan path is the path R34, and such process is repeated until the scanning of one frame is completed. In the present embodiment, it is exemplified that the laser source 102 is turned on every second scan row. The on/off cycle of the laser source 102 on the scan rows is not limited to the above exemplifications.

In an embodiment, image resolution is changed by adjusting the ratio between the turn on time and the turn off time in the drive wave pattern (F2) of the 2D micro-electro-mechanical mirror to the ratio between the turn off time Ta and the turn on time Tb of the laser source 102 in one frame according to the descriptions of FIGS. 5A~5B. In an embodiment, the sum of the recovery time Ta and the frame scan time Tb of the 2D micro-electro-mechanical mirror remains unchanged and each scan line needs a fixed time to complete track scanning. When the frame scan time Tb of the 2D micro-electro-mechanical mirror is increased, the number of times of scanning motions performed by 2D micro-electro-mechanical mirror within increased time Tb is larger than that performed with the laser beam L of the laser source 102 within original time Tb. Since the number of times of scanning motions along the vertical direction is increased, image resolution increases accordingly.

Then, the method as indicated in FIG. 6 is applied. The drive signal of the laser beam L is modulated, so that when the laser beam performs a scanning motion, on the scan path of scan rows, the laser source 102 is cyclically turned on to control the density of the projection pixels P3 on the projection region 120. For example, the laser source 102 can be turned on at an interval of one, two or several scan rows as long as on the scan path of scan rows the laser source 102 is cyclically turned on, and the turn on cycle of the laser source 102 is not restricted.

For example, suppose the image resolution before adjustment is 1080p. The ratio between the turn on time and the turn off time of the drive wave pattern of the 2D micro-electro-mechanical mirror and the laser source 102 in one frame is modulated and the image resolution is increased to 1440p. Then, on the scan path of the 2D micro-electro-mechanical mirror, the on/off state of the laser source 102 is modulated every second scan row, so that the image resolution is halved to 720p so as to maintain excellent image quality.

After the laser beam L performs a scanning motion to form an image on the projection region 120, the projection pixels of initial image resolution exceed the requirement of image resolution when the projection distance d is lower than such as 1.2 m. Under such circumstance, by adjusting the drive wave pattern of the drive signal of the scanning mirror module 104 (the 2D micro-electro-mechanical mirror), the ratio between the recovery time and the frame scan time of the 2D micro-electro-mechanical mirror can be controlled, and the number of scanning times of the scanning mirror module 104 can be modulated. Meanwhile, the density and arrangement of the projection pixels P3 on the projection region 120 can be changed by modulating the on/off state of the laser source 102 every second scan row, such that the image resolution of the laser projection device 100 is changed and the image resolution is adjusted to the corresponding image resolution of the projection distance d. For example, the laser projection device 100 performs projection at a reduced image resolution from 1080p to 720p.

According to the laser projection device 100 and the method for manipulating the same disclosed in the embodiment of FIG. 6, the image resolution can be reduced according to the projection distance d. In an embodiment, the laser projection device 100 further comprises a processor (not illustrated). After the laser projection device 100 uses a distance detection unit 108 to automatically detect the projection distance d, the processor can determine a corresponding recognizable resolution of the projection distance d as an image resolution according to principles of image verification, and the driving module (not illustrated) provides a drive signal of the laser source 102 to drive the laser beam of the laser source 102 according to the image resolution.

The distance detecting method and implementation of the distance detection unit 108 are disclosed above, and the similarities are not repeated here. In another embodiment, the laser projection device 100 comprises a memory device (not illustrated) for storing a plurality of sets of resolution conditions. The driving module outputs a drive signal of the laser source 102 to drive the laser beam L according to resolution conditions. Meanwhile, the user can determine whether to adjust the image resolution according to whether the projection image is clear. If the image is blurred, the user can manually select a default resolution condition built in the memory device to adjust the settings of resolution.

In the present embodiment, it is exemplified that the projection distance is reduced and the initial image resolution is modulated to a corresponding image resolution, but the invention is not limited thereto.

According to the laser projection device 100 and the method for manipulating the same disclosed in above embodiment of the invention, the resolution can be adjusted according to the projection distance d, so that the projection pixels P3 can be recognized and verified, hence resolving the problem of color distortion which occurs when adjacent projection pixels cannot be recognized and verified due to the reduction in projection distance d and maintaining excellent image quality.

Third Embodiment

Figure 7:
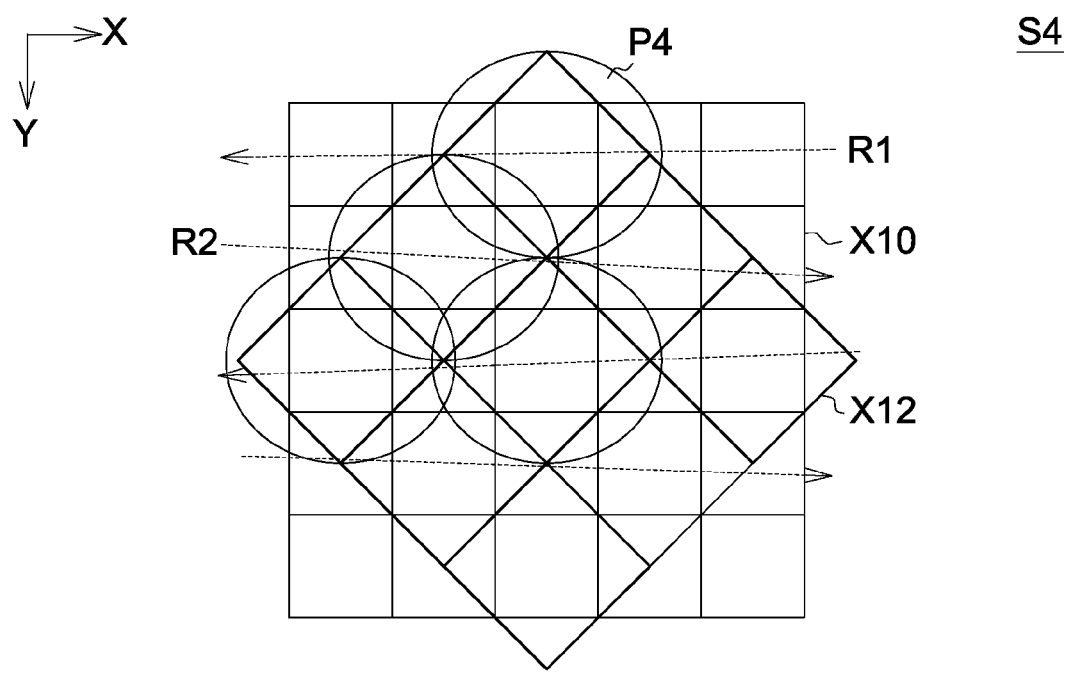
FIG. 7 is a schematic diagram of changing the arrangement of projection pixels according to an embodiment of the invention.

FIG. 7 is a schematic diagram of changing the arrangement of projection pixels according to an embodiment of the invention. Referring to FIG. 7, the projection track S4 comprises a plurality of projection pixels P4. The projection pixels P4 are the area of light spots projected on the projection region 120 when the laser beam L scans along the paths R1 and R2. The pixel definition regions X10 and X12 are dummy region ranges associated with image resolution. The definition of the pixel definition region X10 is similar to the pixel definition region X1 of FIG. 3, and the similarities are not repeated here. It should be noted that FIG. 7 only illustrates a portion of pixel definition regions X10 and X12. In reality, the pixel definition regions X10 and X12 can be further extended outwards. Besides, FIG. 7 only illustrates a portion of projection pixels P4, which can be distributed over the entire pixel definition region X12.

In the present embodiment, the frame is interpolated (converting image message from X10 to X12) by using an algorithm so as to obtain a best arrangement for the re-scaled projection pixels P4 and the pixel definition region X12. Then, the driving module drives the laser source 102 according to the arrangement of re-scaled projection pixels P4. By modulating the drive signal to modulate the on/off time of the laser source 102, the density and arrangement of the projection pixels P4 on the projection region 120 is changed and the projection pixels P4 formed by the projection of the laser beam L are arranged in the form of a diamond-shaped or rhombus matrix so as to adjust the image resolution. For example, the coordinate axes of the original arrangement of pixels (such as the pixel definition region X10 arranged in the form of a chess board) are deflected by 45 degrees to form a re-scaled pixel arrangement (such as the pixel definition region X12 arranged in the form of a diamond-shaped or rhombus matrix).

In an embodiment, after the re-scaled pixel arrangement is obtained by using an algorithm, the image resolution can be reduced from 1920×1080 to 1280×720. Since the paths R1 and R2 are associated with the structure of the scanning mirror module 104 and the same scanning mirror module 104 will generate the same scan path, the scan paths R1 and R2 will not be changed by the reduction in image resolution. Moreover, the laser beam L of the laser source 102 will be in a turn on state on both the scan paths R1 and R2. That is, the laser source 102 does not need to be turned on every second scan row. Thus, the 1080 scan paths along the Y-axis direction can be maintained, and the display brightness can also be maintained.

Suppose the projection distance d is reduced and makes the projection pixels exceed the requirement of image resolution.

According to the reduction in projection distance d, the timing sequence of the high level and low level of the drive signal can be controlled by adjusting the re-scaled pixel arrangement and the on/off state of the laser source 102 can be modulated so as to change the density and arrangement of projection pixels P4 on the projection region 120, and reduce the operating image resolution of the laser projection device 100 to a corresponding image resolution to maintain the brightness of the display image. For example, the resolution level at which the laser projection device 100 projects is reduced from 1080p to 720p.

Figure 8:
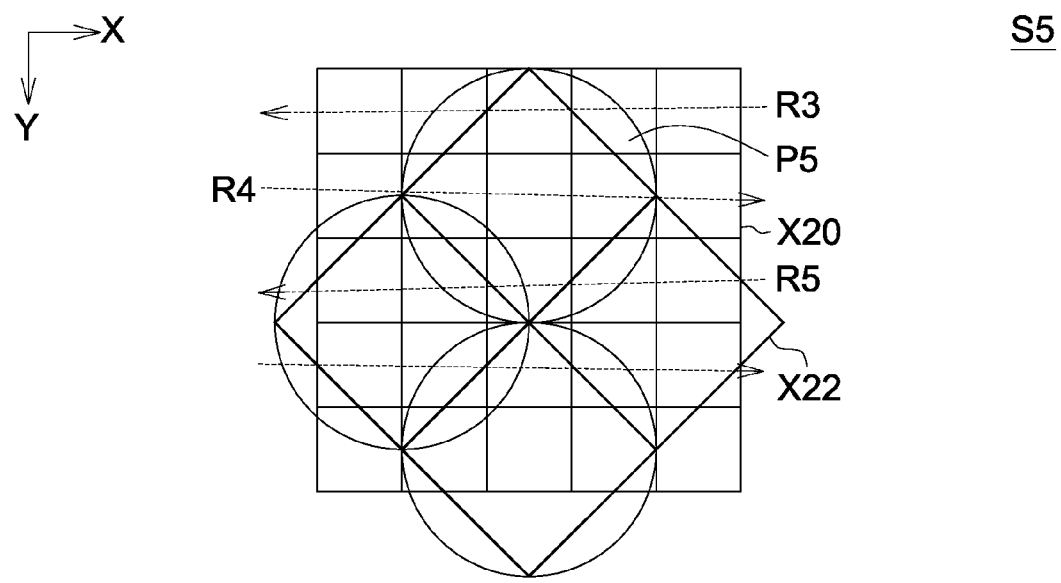
FIG. 8 is another schematic diagram of changing the arrangement of projection pixels according to an embodiment of the invention.

FIG. 8 is another schematic diagram of changing the arrangement of projection pixels according to an embodiment of the invention. Referring to FIG. 8, the projection track S5 comprises a plurality of projection pixels P5. The projection pixels P5 are the area of light spots projected on the projection region 120 when the laser beam L scans along the paths R3, R4 and R5. The pixel definition regions X20 and X22 are dummy region range associated with image resolution. The definition of the pixel definition region X20 is similar to the pixel definition region X1 of FIG. 3, and the similarities are not repeated here. It should be noted that only a portion of pixel definition regions X20 and X22 is illustrated. In reality, the pixel definition regions X20 and X22 can be further extended outwards. Besides, FIG. 8 only illustrates a portion of projection pixels P5, which can be distributed over the entire pixel definition region X22.

In the present embodiment, the frame is interpolated (converting image message from X20 to X22) by using an algorithm so as to obtain a best arrangement for the re-scaled projection pixels P5 and the pixel definition region X22. Then, the driving module drives the laser source 102 according to the arrangement of re-scaled projection pixels P5. By modulating the drive signal to modulate the on/off time of the laser source 102, the density and arrangement of the projection pixels P5 on the projection region 120 is changed and the projection pixels P5 formed by the projection of the laser beam L are arranged in the form of another diamond-shaped or rhombus matrix so as to adjust the image resolution.

The pixel arrangement of FIG. 8 is obtained by deflecting the original arrangement of pixels (such as the pixel definition region X20 arranged in the form of a chess board) by 45 degrees to form a re-scaled pixel arrangement (such as the pixel definition region X22 arranged in the form of a diamond-shaped or rhombus matrix). In an embodiment, after the re-scaled pixel arrangement is obtained by using an algorithm, the image resolution can be reduced from 1920×1080 to 850×480. Since the same scanning mirror module 104 will generate the same scan path, the scan path will not be changed by the reduction in image resolution. Moreover, the laser beam L of the laser source 102 will be in a turn on state on the scan paths R3, R4 and R5. That is, the laser source 102 does not need to be turned on every second scan row. Thus, the 1080 scan paths along the Y-axis direction can be maintained, and the display brightness can also be maintained.

Suppose the projection distance d is reduced and makes the projection pixels exceed the requirement of image resolution. According to the reduction in projection distance d, the timing sequence of the high level and low level of the drive signal can be controlled by adjusting the re-scaled pixel arrangement and the on/off state of the laser source 102 can be modulated so as to change the density and arrangement of projection pixels P5 on the projection region 120, and reduce the operating image resolution of the laser projection device 100 to a corresponding image resolution to maintain the brightness of the display image. For example, the resolution level at which the laser projection device 100 projects is reduced from 1080p to 480p.

According to the laser projection device 100 and the method for manipulating the same disclosed in embodiments of FIGS. 7~8, the image resolution can be reduced according to the projection distance d. In an embodiment, the laser projection device 100 further comprises a processor (not illustrated). After the laser projection device 100 uses a distance detection unit 108 to automatically detect the projection distance d, the processor can determine a corresponding recognizable resolution of the projection distance d as an image resolution according to principles of image verification, so that the driving module (not illustrated) provides a drive signal of the laser source 102 according to the image resolution.

The distance detecting method and implementation of the distance detection unit 108 are disclosed above, and the similarities are not repeated here. In another embodiment, the laser projection device 100 further comprises a memory device (not illustrated) for storing a plurality of sets of resolution conditions. The driving module outputs a drive signal of the laser source 102 to drive the laser beam L according to resolution conditions. If the user feels the image is blurred or color saturation become deteriorated, the user can manually select a default resolution condition built in the memory device to adjust the settings of resolution.

According to the laser projection device 100 and the method for manipulating the same disclosed in above embodiments of the invention, the resolution level can be adjusted according to the reduction in projection distance d, so that the projection pixels P4 and P5 can be recognized and verified, hence resolving the problem of color distortion which occurs when adjacent projection pixels cannot be recognized and verified due to the reduction in projection distance d and maintaining excellent image quality.

According to the laser projection device and the method for manipulating the same disclosed in above embodiments of the invention, the resolution level can be adjusted according to the reduction in projection distance d, so that projection pixels can be recognized and verified. In an embodiment, when the projection distance reduces and makes that projection pixels exceed the requirement of image resolution, adjacent projection pixels cannot be recognized and verified and the problem of color distortion will occur. To resolve the said problem and maintain excellent image quality, a drive signal can be outputted according to the image resolution to change the drive wave pattern of the 2D micro-electro-mechanical mirror, the on/off time of the laser source, and at least one of the density and arrangement of the projection pixels on the projection region to reduce the image resolution.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manipulating a laser projection device, comprising:
providing a laser projection device comprising a laser source, a driving module, a memory device and a scanning mirror module, wherein the scanning mirror module is disposed at one side of the laser source, and the laser source provides a laser beam, wherein a plurality of sets of resolution conditions are stored to the memory device, and a resolution condition selected from the plurality of sets of resolution conditions is outputted according to a projection distance;

swaying the scanning mirror module to reflect the laser beam, so that the laser beam performs a scanning motion to form a projection track on a projection region;

using the driving module, according to the selected resolution condition, to provide a first drive signal to modulate the number of scanning times of the scanning mirror module and provide a second drive signal to control the on/off time of the laser source to adjust an initial image resolution to a corresponding image resolution, wherein the projection distance is a distance between the laser source and the projection region, and the corresponding image resolution is lower than the initial image resolution.

2. A method for manipulating a laser projection device, comprising:

providing a laser projection device comprising a laser source, a driving module, a processor, a distance detection unit and a scanning mirror module, wherein the scanning mirror module is disposed at one side of the laser source, and the laser source provides a laser beam;

automatically detecting a projection distance by the distance detection unit;

determining a recognizable resolution corresponding to the projection distance as a corresponding image resolution according to the verification rate of the projection distance based on the principles of image verification;

swaying the scanning mirror module to reflect the laser beam, so that the laser beam performs a scanning motion to form a projection track on a projection region;

using the driving module, according to the corresponding image resolution, to provide a first drive signal to modulate the number of scanning times of the scanning mirror module and provide a second drive signal to control the on/off time of the laser source to adjust an initial image resolution to the corresponding image resolution, wherein the projection distance is a distance between the laser source and the projection region, and the corresponding image resolution is lower than the initial image resolution.

3. A method for manipulating a laser projection device, comprising:

providing a laser projection device comprising a laser source, a driving module and a scanning mirror module, wherein the scanning mirror module is disposed at one side of the laser source, and the laser source provides a laser beam, wherein the scanning mirror module comprises a mirror and a gimbal, the gimbal being associated with a number of frames per unit time;

swaying the scanning mirror module to reflect the laser beam, so that the laser beam performs a scanning motion to form a projection track on a projection region;

using the driving module, according to a projection distance, to provide a first drive signal to modulate the number of scanning times of the scanning mirror module and provide a second drive signal to control the on/off time of the laser source to adjust an initial image resolution to a corresponding image resolution, wherein the step of controlling the on/off time of the laser source comprises:

modulating the first drive signal of the scanning mirror module in one frame to reduce a frame scan time of the scanning mirror module, so that the number of scanning times of the scanning mirror module is reduced, and modulating the second drive signal to collaborates with the first drive signal, so that the on/off time of the laser source corresponds to the frame scan time of the scanning mirror module, wherein the projection distance is a distance between the laser source and the projection region, and the corresponding image resolution is lower than the initial image resolution.

4. The method for manipulating a laser projection device according to claim 3, wherein the step of enabling the laser beam to perform the scanning motion comprises:

oscillating the scanning mirror module so that the scanning motion is performed on the optical path of the laser beam according to an oscillation frequency of an oscillation wave, and switching the on/off state of the laser beam at the same time, wherein when the scanning motion is performed on the optical path of the laser beam according to the oscillation frequency, the sum of a recovery time of the scanning mirror module and the frame scan time remains unchanged.

5. The method for manipulating a laser projection device according to claim 1, wherein the projection track comprises a plurality of projection pixels, the step of adjusting the initial image resolution to the corresponding image resolution by the driving module comprises:

modulating the on/off time of the laser source and adjusting at least one of the density and arrangement of the plurality of the projection pixels on the projection region to output the second drive signal to drive the laser source according to the corresponding image resolution.

6. A method for manipulating a laser projection device, comprising:

providing a laser projection device comprising a laser source, a driving module and a scanning mirror module, wherein the scanning mirror module is disposed at one side of the laser source, and the laser source provides a laser beam, wherein the scanning mirror module comprises a mirror and a gimbal, the gimbal relating to a number of frames provided per unit time;

swaying the scanning mirror module to reflect the laser beam, so that the laser beam performs a scanning motion to form a projection track on a projection region, wherein the projection track comprises a plurality of projection pixels and a plurality of scan rows;

using the driving module, according to a projection distance, to provide a first drive signal to modulate the number of scanning times of the scanning mirror module and provide a second drive signal to control the on/off time of the laser source to adjust an initial image resolution to a corresponding image resolution, wherein the step of modulating the on/off time of the laser source comprises:

modulating the first drive signal of the scanning mirror module in one frame to increase a frame scan time of the first drive signal corresponding to the scanning mirror module; and modulating the second drive signal of the laser source, so that when the laser beam performs the scanning motion, the laser source is cyclically activated in the plurality of scan rows to control the density of plurality of the projection pixels on the projection region, wherein the projection distance is a distance between the laser source and the projection region, and the corresponding image resolution is lower than the initial image resolution.

7. The method for manipulating a laser projection device according to claim 6, wherein the step of enabling the laser beam to perform the scanning motion comprises:
oscillating the scanning mirror module so that the scanning motion is performed on the optical path of the laser beam according to an oscillation frequency of an oscillation wave, and switching the on/off state of the laser beam at the same time; and
the step of increasing the frame scan time of the first drive signal corresponding to the scanning mirror module comprises:
increasing the turn on time of the laser source when the optical path of the laser beam performs the scanning motion according to the oscillation frequency, so that the number of scanning times of the scanning mirror module within the frame scan time is increased, wherein the sum of a recovery time of the scanning mirror module and the frame scan time of the scanning mirror module remains unchanged.

8. A method for manipulating a laser projection device, comprising:
providing a laser projection device comprising a laser source, a driving module and a scanning mirror module, wherein the scanning mirror module is disposed at one side of the laser source, and the laser source provides a light beam;
swaying the scanning mirror module to reflect the light beam and form a projection track on a projection region; and
adjusting an initial image resolution to a corresponding image resolution, modulating the on/off time of the laser source, and adjusting at least one of the density and arrangement of the plurality of the projection pixels on the projection region by the driving module according to the reduction in a projection distance to output a drive signal to drive the laser source according to the corresponding image resolution, wherein the projection distance is a distance between the laser source and the projection region, and the corresponding image resolution is lower than the initial image resolution.

9. The method for manipulating a laser projection device according to claim 8, wherein the laser projection device further comprises a memory device, and the step of outputting the drive signal to drive the laser source further comprises:
storing a plurality of sets of resolution conditions to the memory device and outputting a resolution condition selected from the plurality of sets of resolution conditions according to the projection distance; and
outputting the drive signal by the driving module to drive the laser source according to the resolution condition.

10. The method for manipulating a laser projection device according to claim 8, wherein the laser projection device further comprises a processor and a distance detection unit, and the method for manipulating a laser projection device further comprises:
automatically detecting the projection distance by the distance detection unit; and
determining a recognizable resolution corresponding to the projection distance as the corresponding image resolution according to the verification rate of the projection distance based on the principles of image verification, so that the driving module provides a drive signal to drive the laser source according to the corresponding image resolution.

11. The method for manipulating a laser projection device according to claim 8, wherein the projection track comprises a plurality of projection pixels, the method further comprises:
interpolating a frame by using an algorithm for arranging the plurality of projection pixels according to a re-scaled arrangement; and
driving the laser source by the driving module according to the re-scaled arrangement for arranging the plurality of projection pixels projected by the laser beam in the form of a diamond-shaped or rhombus matrix of pixels.

12. A laser projection device comprising:
a laser source providing a laser beam;
a scanning mirror module disposed at one side of the laser source, wherein the scanning mirror module is swayed to reflect the laser beam, so that the laser beam performs a scanning motion to form a projection track on a projection region;
a memory device, wherein a plurality of sets of resolution conditions are stored to the memory device, and a resolution condition selected from the plurality of sets of resolution conditions is outputted according to a projection distance; and
a driving module, according to the selected resolution condition, providing a first drive signal to modulate the number of scanning times of the scanning mirror module and providing a second drive signal to control the on/off time of the laser source to adjust an initial image resolution to a corresponding image resolution,
wherein the projection distance is a distance between the laser source and the projection region, and the corresponding image resolution is lower than the initial image resolution.

13. A laser projection device comprising:
a laser source providing a laser beam;
a scanning mirror module disposed at one side of the laser source, wherein the scanning mirror module is swayed to reflect the laser beam, so that the laser beam performs a scanning motion to form a projection track on a projection region;
a memory device, wherein a plurality of sets of resolution conditions are stored to the memory device, and a resolution condition selected from the plurality of sets of resolution conditions is outputted according to a projection distance; and
a driving module adjusting an initial image resolution to a corresponding image resolution, modulating the on/off time of the laser source, and adjusting at least one of the density and arrangement of the plurality of the projection pixels on the projection region by the driving module according to the reduction in the projection distance to output a drive signal to drive the laser source according to the selected resolution condition,
wherein the projection distance is a distance between the laser source and the projection region, and the corresponding image resolution is lower than the initial image resolution.

* * * * *